United States Patent [19]
Lane et al.

[11] Patent Number: 5,148,230
[45] Date of Patent: Sep. 15, 1992

[54] MEASUREMENT APPARATUS HAVING IMPROVED SAMPLE DENSITY USING NESTED DATA ACQUISITIONS

[75] Inventors: Richard I. Lane, Bend; Glenn Bateman, Redmond; Josef L. Mader, Bend, all of Oreg.; Ronald J. Bremer, Vancouver, Wash.

[73] Assignee: Tektronix, Inc., Wilsonville, Oreg.

[21] Appl. No.: 514,396

[22] Filed: Apr. 25, 1990

[51] Int. Cl.$^5$ .................... G01N 21/88; G09G 1/02
[52] U.S. Cl. ................................ 356/73.1; 340/799
[58] Field of Search .................. 356/73.1; 340/799

[56] References Cited
U.S. PATENT DOCUMENTS

| | | | |
|---|---|---|---|
| 4,439,762 | 3/1984 | Van Vliet et al. | 340/799 X |
| 4,528,561 | 7/1985 | Kitamura | 340/721 X |
| 4,893,006 | 1/1990 | Wakai et al. | 356/73.1 |

*Primary Examiner*—Vincent P. McGraw
*Attorney, Agent, or Firm*—John Smith-Hill; William B. Bucher

[57] ABSTRACT

An instrument for depicting change in the value of a first variable as a function of a second variable comprises a display device for displaying a set of n measured values distributed along a display axis, and a sampler for acquiring a set of N (greater than n) samples of the first variable and storing values of those N samples in ordered fashion relative to a first storage domain that maps to the second variable. A set of n display samples is selected from the set of N stored samples and the values of that set of n display samples are provided to the display device. When the set of n display samples is a set of samples that are at a predetermined spacing in the first storage domain and/or occupy a selected interval of the first storage domain, a set of N1 (greater than n) samples of the first variable are acquired and their values are stored in ordered fashion relative to a second storage domain that maps to the interval of the first storage domain.

9 Claims, 2 Drawing Sheets

MEASUREMENT APPARATUS HAVING IMPROVED SAMPLE DENSITY USING NESTED DATA ACQUISITIONS

BACKGROUND OF THE INVENTION

This invention relates to a test and measurement instrument with digital storage.

FIG. 1 of the accompanying drawings illustrates in simplified fashion the overall architecture of an optical time domain reflectometer (OTDR) 2, used to test the condition of an optical fiber 6. FIG. 1 is not intended to illustrate a specific prior art OTDR, but to provide a context in which features that are currently found in OTDRs can be discussed. OTDR 2 comprises a laser diode 8 that is energized intermittently by a laser driver 10 to launch interrogation pulses into fiber 6 by way of a directional coupler 14 and a launch fiber 16, which is connected to fiber 6 by a connector 18. OTDR 2 receives return light from fiber 6 due to Rayleigh backscattering and Fresnel reflection. The intensity of the backscattered and reflected light depends on the condition of the fiber under test.

A portion of the return light received from fiber 6 is coupled through coupler 14 to a photodetector 20, which generates a current signal representative of the intensity of the return light. The current signal is converted to a voltage signal and the voltage signal amplified by a transimpedance amplifier (not shown), and the amplified voltage signal provided by the transimpedance amplifier is sampled and converted to digital form by an analog-to-digital converter (ADC) 24. A timing controller 30 controls the timing of the operation of ADC 24 relative to laser driver 10.

The digital sample values V provided by ADC 24 are written into an acquisition memory 28 at respective addresses that depend on the timing T of the samples relative to the respective interrogation pulses. For the purposes of this description, it will be assumed that memory 28 has 2048 storage locations.

The interval between launch of an interrogation pulse and sampling of the output of the photodetector determines the location of the length segment of the fiber from which the return light is received. Timing controller 30 operates in response to signals provided by user interface 40 to establish the effective sampling frequency of the return signal and the interval relative to the interrogation pulses within which sampling takes place. In this manner, the condition of fiber 6 within an acquisition window is tested and the user controls the length and position of the acquisition window and the resolution with which the fiber is tested. The data record V (T) stored in memory 28 represents the variation in condition of the fiber under test as a function of position within the acquisition window.

OTDR 2 also comprises a cathode ray tube (CRT) display device 32 having a rectangular array of 512×512 addressable pixels. Display device 32 is used to provide a display in a rectangular cartesian coordinate system of intensity of return light received by detector 20, represented by voltage, as a function of distance along the fiber under test, represented by time. A display controller 34 provides deflection signals to display device 32. The deflection signals cause the electron beam of the display device to execute a horizontal raster scan. Each addressable pixel of display device 32 is associated with a unique time slot within the field of the raster.

In order to provide a display, a segment of the address space of acquisition memory 28 is selected by use of horizontal position and expansion signals provided by user interface 40 and data values representative of the contents of the selected segment of acquisition memory 28 are loaded into a display memory 36. Display memory 36 has 512×512 addressable memory locations, each of which can store a single bit. The addressable memory locations of display memory 36 correspond on a one to one basis with the raster time slots of the addressable pixels of display device 32. Display controller 34 generates 512 equally spaced address words T within the selected segment of the address space of memory 28, and reads the associated data values V from the acquisition memory. Display controller 34 translates each data value V and its associated address word T into the raster time slot of the pixel that should be illuminated in order to display a data point at the proper horizontal and vertical position on the screen of display device 32, and writes a logical one into the corresponding memory location of display memory 36. When display memory 36 has been loaded, display controller 34 repetitively scans the addressable pixels of display device 32 and repetitively reads the contents of display memory 36 in timed relation to the scanning of display device 32. The digital values read from memory 36 are converted to analog form and are applied to the intensity control input of display device 32, and an image of the contents of memory 36 is formed. In this fashion, a graphic display is provided of the portion of the data record defined by the horizontal position and expansion signals and this display represents variation of the condition of the fiber as a function of distance within a display window.

Since the data record contains 2,048 sample values and only 512 equally spaced values are used to create the display, the resolution of the display may be altered. For example, the condition of the fiber over the entire acquisition window may be displayed at low resolution by reading every fourth sample from the first to the 2,045th, whereas maximum resolution over a shorter display window is achieved by displaying a block of 512 adjacent samples. In order to increase the resolution still further, it is necessary to acquire new data at a higher effective sampling frequency. When a new data record is acquired, the original data record is overwritten.

SUMMARY OF THE INVENTION

In accordance with a first aspect of the invention, an instrument for depicting change in the value of a first variable as a function of a second variable comprises a display device for displaying a set of n measured values distributed along a display axis, sampling means for acquiring a set of N (greater than n) samples of the first variable and storing values of those N samples in ordered fashion relative to a first storage domain that maps to the second variable, means for selecting a set of n display samples from the set of N stored samples and providing the values of that set of n display samples to the display device, and enhancement means operable when the set of n display samples is a set of samples that are at a predetermined spacing in the first storage domain and/or occupy a selected interval of the first storage domain to acquire a set of N1 (greater than n) samples of the first variable and store values of those N1 samples in ordered fashion relative to a second storage domain that maps to at least said interval of the first storage domain.

In accordance with a second aspect of the invention, a method of providing a display that depicts change in variation of the value of a first variable as a function of a second variable comprises acquiring a set of N samples of the first variable distributed over a measurement domain that maps to the second variable, storing values of said N samples, selecting a set of n (less than N) display samples from the set N stored samples and displaying the magnitudes of the set of n display samples in ordered fashion along a display axis, and when the set of n display samples selected from the set of N stored samples is a set of samples that are at a predetermined spacing in the measurement domain and/or occupy a selected interval of the measurement domain, acquiring and storing values of a set of N1 (greater than n) samples of the first variable distributed over at least the selected interval of the measurement domain.

BRIEF DESCRIPTION OF THE DRAWINGS

For a better understanding of the invention, and to show how the same may be carried into effect, reference will now be made, by way of example, to the accompanying drawings in which.

In the different figures of the drawings, like reference numerals designate like components, and primed reference numerals designate components that have similar functions to the components designated by the corresponding unprimed reference numerals.

DETAILED DESCRIPTION

Figure 1:
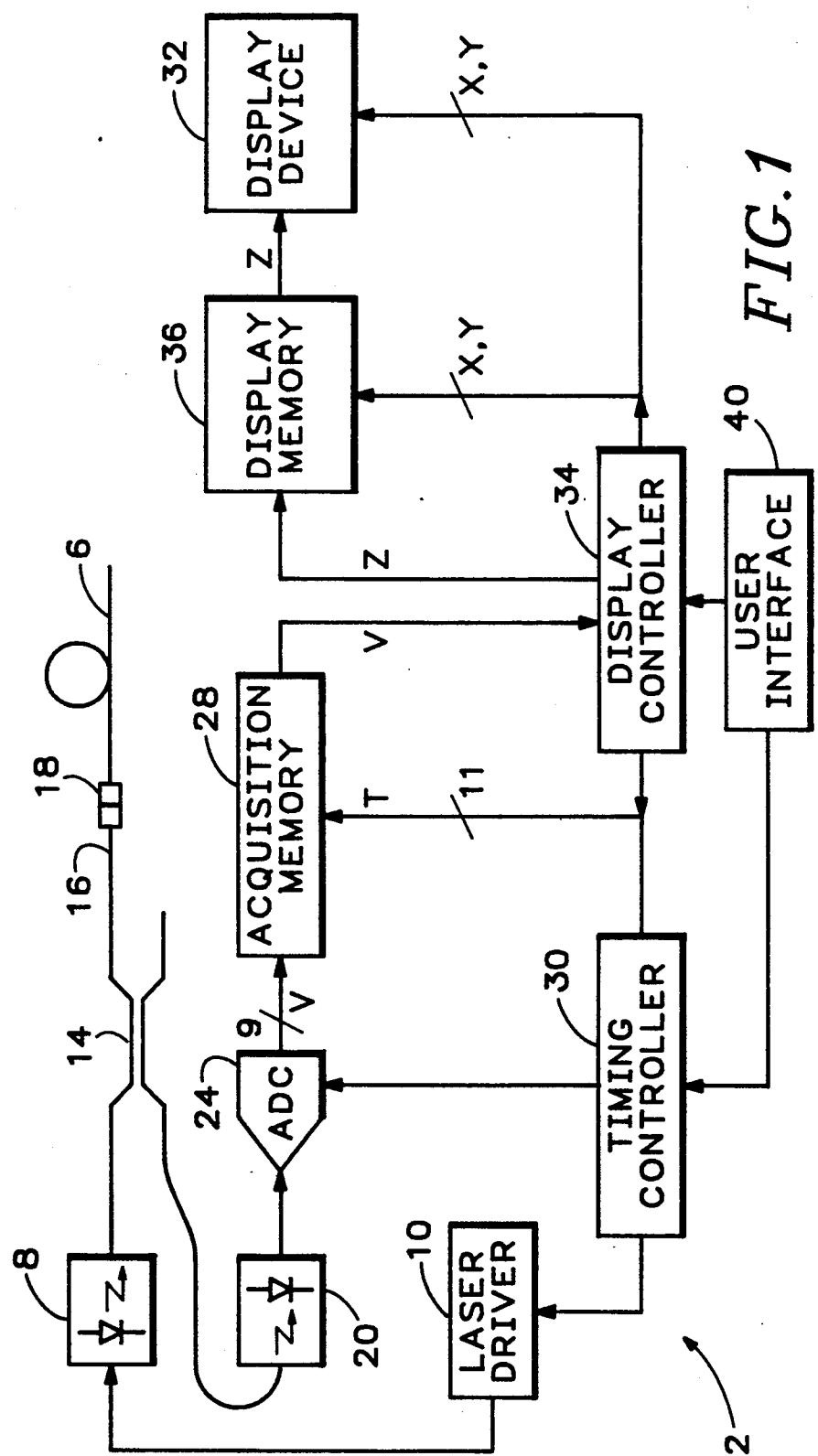
FIG. 1 is a simplified block diagram illustrating an OTDR that is not in accordance with the present invention.
Figure 2:
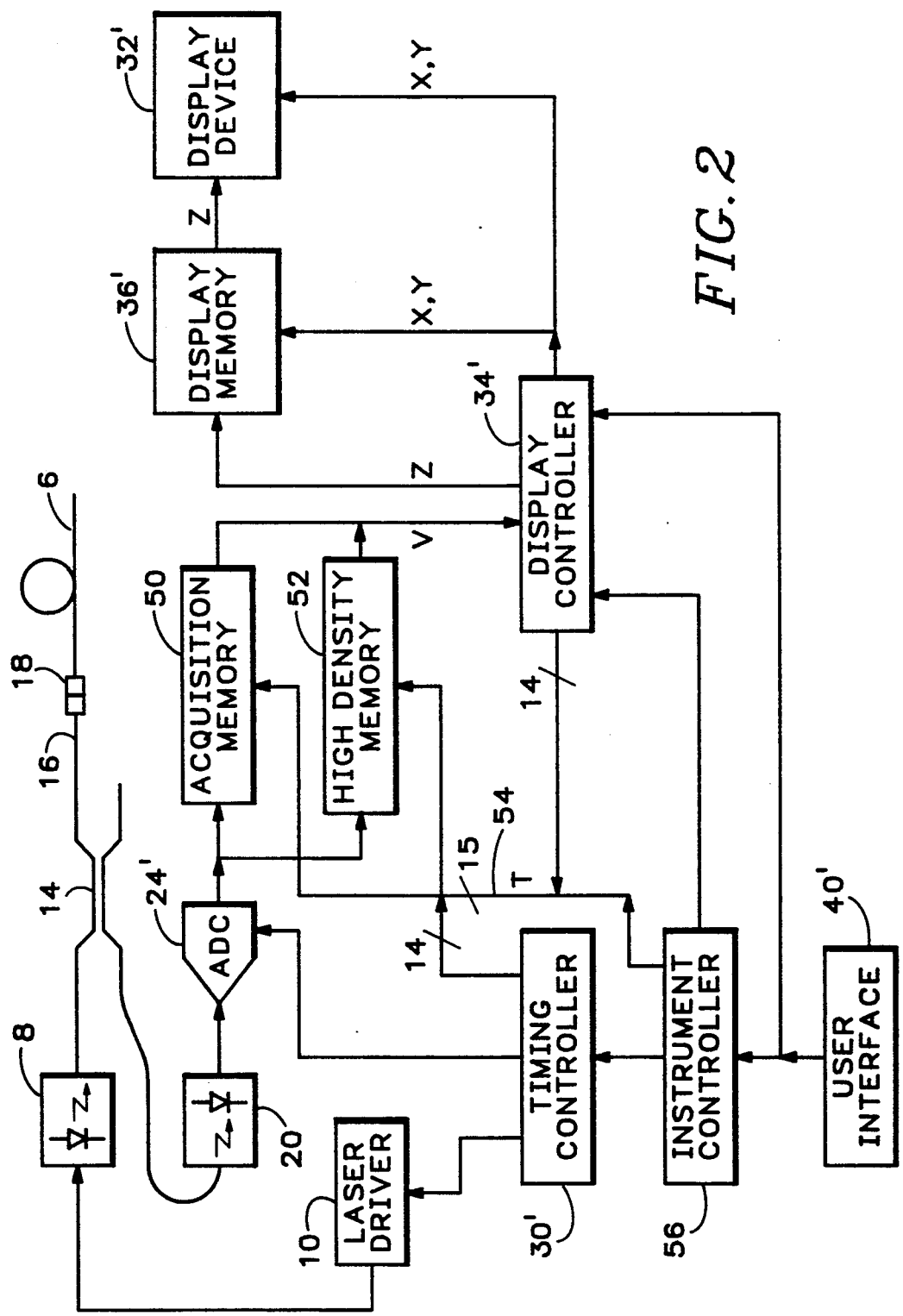
FIG. 2 is a block diagram illustrating an OTDR in accordance with the present invention.

The OTDR shown in FIG. 2 has first and second acquisition memories 50 and 52, each with 16,384 memory locations, and a display memory 36' with 640×480 memory locations. The two acquisition memories occupy contiguous address spaces on a 15-bit address bus 54. The MSB of bus 54 determines whether memory 50 or 52 is addressed and the lower 14 bits of an address word on bus 54 define a single memory location in whichever acquisition memory is addressed. Depending on the operating mode of the OTDR, timing controller 30' provides the lower 14 bits of the address words on bus 54. The MSB of bus 54 is provided by an instrument controller 56. Each memory location in each memory 50, 52 is able to store a 16-bit data word.

In operation of the OTDR, the user initially places the user interface in a condition such that the OTDR operates in an acquisition mode. In this mode of operation, controller 56 holds the MSB of the address bus at logical zero and the 16-bit data values provided by ADC 24' are loaded into memory 50 at locations that depend on equivalent time values provided by timing controller 30'. When the acquisition is complete, controller 56 places the OTDR in its normal display mode, in which the contents of memory 50 are used to load display memory 36' and provide a display on display device 32'. Display device 32' has 307,200 addressable pixels organized in an array of 640 vertical columns and 480 horizontal rows and corresponding on a one-to-one basis with the memory locations of display memory 36'. Each memory location of display memory 36' is able to store a four-bit digital word, although only three of the 16 possible values of that word, corresponding to the associated pixel of display device 32' being off, on at low intensity and on at high intensity, are used. Part of the display area of display device 32' is occupied by alphanumeric information, and only 512 of the vertical columns are available for displaying a waveform derived from the contents of acquisition memory 50 or 52. The instrument controller operates under control of the horizontal position and expansion signals provided by user interface 40' to generate beginning and end signals representing respective addresses in memory 50. Controller 56 applies the beginning and end signals to display controller 34', which generates a sequence of 512 uniformly spaced address words within the 14-bit address space of memory 50, starting at the address represented by the beginning signal and ending at the address represented by the end signal. The resulting 512 sample values are read from acquisition memory 50 and display controller 34' translates each sample value and its associated time value, in conjunction with horizontal and vertical position and expansion signals provided by user interface 40', into a raster time slot and writes the data value that corresponds to the associated pixel of display device 32' being illuminated at low intensity into the corresponding memory location of display memory 36'. Display controller 34' also loads data representing text and numerical information into appropriate locations of display memory 36'. Display memory 36' and display device 32' are repetitively scanned under control of display controller 34' and the contents of display memory 36' are used to display a waveform that represents the condition of the fiber under test over the display window defined by the horizontal position and expansion signals. Using the horizontal expansion and position controls, the user is able to adjust the length and position of the display window relative to the acquisition window.

When the display window is shortened sufficiently that a block of 512 adjacent sample values is used to form the display, the instrument controller 56 provides a display to inform the user that the limit of resolution of the data record stored in acquisition memory 50 has been reached. The user may respond to this message by initiating a second acquisition, which then takes place automatically, without further intervention by the user, at a higher sample density per unit length of fiber, for example five times the density of the original acquisition. During the high density acquisition, controller 56 sets the MSB of the address bus at logical one, and therefore the high density data record is loaded into memory 52. The high density data record represents the condition of fiber 6 within an expansion window that covers part of the acquisition window. The expansion window is longer than the display window and is centered with respect to the display window unless the display window is near an end of the acquisition window, in case the expansion window is offset relative to the display window so that the entire expansion window is within the acquisition window.

Controller 56 calculates and stores the address words that define the locations in memory 50 that correspond to the beginning and end of the expansion window and also calculates and stores the address words that define the locations in the memory space of memory 52 that correspond to the beginning and end of the display window. When the high density acquisition is complete, the OTDR enters a high density display mode. Controller 56 holds the MSB of the address bus at logical one and applies the address words corresponding to the beginning and end of the display window to display controller 34'. Display controller 36' generates a sequence of 512 uniformly spaced 14-bit address words between the words corresponding to the beginning and end of the display window. Since the MSB of address bus 54 is at logical one, the address words are used to read memory 52 and the contents of memory 52 are used to load display memory 36'. Therefore, in the high density display mode, the display is provided by selecting pixels on the basis of the contents of memory 52. In the high density display mode, the memory locations of memory 36' that are loaded on the basis of the contents of memory 52 are loaded with the data value that corresponds to the pixels of display device 32' being illuminated at high intensity. The user can therefore tell immediately from the display that high density data is being used to provide the display.

The user can operate interface 40 to adjust the position and length of the display window relative to the expansion window. When the contents of a portion of memory 52 are displayed at maximum resolution, controller 56 enables a third acquisition and the third data record is loaded into memory 52, overwriting the second data record. Controller 56 calculates and stores the address words that define the locations in memory 50 that correspond to the beginning and end of the new expansion window.

When a high density acqusition has been taken and the user operates interface 40' to reduce the resolution, so that the display window extends beyond the expansion window in at least one direction, the instrument controller automatically returns the MSB of the address bus to logical zero and the contents of memory 50 are again used to provide the display. However, the instrument then performs two read operations when it loads the display memory. On the first read operation, controller 56 causes display controller 34' to generate the set of addresses necessary to read the portion of the address space of memory 50 that corresponds to the display window, and on the second read operation controller 56 causes display controller 34' to generate only the subset of addresses necessary to read the portion of the address space that corresponds to the segment of the expansion window that lies within the display window. Both sets of data are used to load display memory 36'. Therefore, the portion of the display that represents the condition of the fiber within the expansion window will be brighter than the rest of the display. Of course, if the display window does not include any part of the expansion window, the entire waveform will be shown at uniform intensity.

The original data record can be represented by sample values $S_O \ldots S_i \ldots S_{(N-1)D}$, where i si the distance of the segment of the fiber that is sampled from the beginning (0) of the acquisition window, N is the number of samples in the data record, and D is the resolution, expressed in length of fiber, of the first acquisition. The portion of the original data record that corresponds to the display window when the record is viewed at maximum resolution may be represented by the sample values $S_X \ldots S_Y$, where X depends on the horizontal position control, $Y-X$ is equal to $(n-1)D$, and n is the number of illuminated pixels. On the second acquisition, the high density data record stored in memory 52 can be represented by the sample values $S'_P \ldots S'_Q$, where $O <= P <= X$ and $Y <= Q <= (N-1)D$. It will be seen that the expansion window covers the entire display window and can extend beyond the display window at one or both ends.

When the contents of the second memory are viewed at maximum resolution, the display is represented by sample values $S'_R \ldots S'_T$, where $P <= R$, $T <= Q$, $T-R$ is equal to $(n-1) D'$, and D' is the resolution of the second acquisition. A third acquisition can then be taken at a still higher density. The third acquisition forms the data record $S''_U \ldots S''_V$ where $P <= U <= R$ and $T <= V <= Q$.

To acquire high density data outside the current expansion window, the user simply moves the display window beyond the expansion window and the original data record is displayed. If the resolution of the display is increased to the limit, a high density acquisition is enabled and the contents of memory 52 are overwritten upon initiation of the high density acquisition.

It will be recalled that the data values provided by ADC 24' are each composed of 16 bits, allowing over 64,000 signal levels to be distinguished, yet the number of signal levels that can be displayed at one time is less than 480. The additional signal levels are acquired in order to allow change in the vertical position and range of the displayed interval of signal levels relative to the acquired signal levels.

It will be appreciated that the invention is not restricted to the particular embodiment that has been described, and that variations may be made therein without departing from the scope of the invention as defined in the appended claims and equivalents thereof. For example, although it is preferred for purposes of memory conservation that only one high density memory be used in addition to the original acquisition memory, and that the second and each subsequent high density acquisition overwrite the data acquired at the previous level, it is possible to provide multiple high density memories and to preserve one or more high density records when a new high density acquisition is executed. Further, although the invention has been described with reference to a monochrome display device, a color display device could be used, in which case the expansion window could be highlighted by use of a different color instead of by intensifying pixels.

We claim:

1. A measurement apparatus for acquiring data from the output of a device under test for displaying on a display device having n display locations distributed along a display axis comprising:
   an acquisition system having means for sampling the output of the device under test over first and second timed intervals to respectively acquire first and second sets of data samples, N and N1, (N and N1 being greater than n) wherein N1 has a sample density greater than N and the time interval of N1 is within the time interval of N, the sets of N and N1 data samples being stored at addressable locations in respective first and second storage domains with the boundaries of the address locations being a function of the interval times;
   means for selecting a set of n display samples from the stored set of N data samples that are uniformly spaced over all or a portion of the set of N data samples for displaying on the display device; and
   means operable on the acquisition system for acquiring and storing the second set of data samples N1 as a function of the selecting means selecting a set of N data samples having adjacent address locations for the set of uniformly spaced n display samples, the boundaries of the adjacent address locations of the selected set of N data samples defining a minimum timing interval for the set of N1 data samples.

2. A measurement apparatus according to claim 1 comprising a first memory for receiving the set of N data samples and a second memory for receiving the set of N1 data samples.

3. The measurement instrument as recited in claim 1 further comprising means for selecting a set of n display samples from the set of N1 stored data samples that are uniformly spaced over all or a portion of the set of N1 data samples for displaying on the display device.

4. The measurement instrument as recited in claim 3 further comprising means operable on the acquisition system for acquiring and storing additional sets of data samples N2 ... NX as a function of the selecting means selecting a set data samples from the respective N2 ... NX data samples having adjacent address locations as the set of uniformly spaced n display samples, the set of N2 ... NX data samples being greater than n with each subsequent set of data samples being within the interval of the previous set of data samples and having a greater sample density than the previous set of data samples up to the minimum sample spacing of the acquisition system.

5. A method of acquiring data from the output of a device under test for displaying on a display device having n display locations distributed along a display axis comprising the steps of:

(a) sampling the output of the device under test over a timed interval to acquire first set of data samples N (greater than n);

(b) storing the first set of data samples N in a first storage domain at addressable locations wherein the boundaries of the address locations are a function the interval time;

(c) selecting a set of n display samples from the set of N stored data samples that are uniformly spaced over all or a portion of the set of N data samples for displaying on the display device;

(d) sampling the output of the device under test over a timed interval contained within the timed interval for the set of N data samples to acquire a second set of data samples N1 having a sample density greater than the first set of data samples N as a function of the selecting means selecting a set of N data samples having adjacent address locations for the set of uniformly spaced n display samples, the boundaries of the adjacent address locations defining a minimum timing interval for the set of N1 data samples; and (e) storing the second set of data samples N1 in a second storage domain at addressable locations wherein the boundaries of the address locations are a function the interval time.

6. A method according to claim 5, further comprising the step of selecting a set of n display samples from the set of N1 stored data samples that are uniformly spaced over all or a portion of the set of N1 data samples for displaying on the display device.

7. The method according to claim 5 further comprising the step of acquiring and storing additional sets of data samples N2 ... NX as a function of the selecting means selecting a set data samples from the respective N2 ... NX data samples having adjacent address locations as the set of uniformly spaced n display samples, the set of N2 ... NX data samples being greater than n with each subsequent set of data samples being within the interval of the previous set of data samples and having a greater sample density than the previous set of data samples up to the minimum sample spacing of the acquisition system.

8. A method according to claim 5 for acquiring data from one end of an optical fiber under test of intensity of return light received from the fiber in response to an interrogation pulse, wherein step (a) comprising launching interrogation pulses into the fiber by way of said one end thereof, generating an electrical signal representative of the intensity of return light received from said one end of the fiber, and sampling the electrical signal at predetermined times relative to the time of launching the interrogation pulses.

9. A method according to claim 5, wherein the set of N1 data samples that are acquired and stored in steps (d) and (e) are distributed over more than the minimum timing interval.

* * * * *